United States Patent [19]

Berler et al.

[11] 3,731,064

[45] May 1, 1973

[54] DATA PROCESSING SYSTEM AND READER THEREFOR

[75] Inventors: Robert M. Berler, Westport, Conn.; Norman Alpert, Scarsdale, N.Y.; Nanjundiah N. Murthy, West Redding, Conn.

[73] Assignee: Pitney Bowes-Alpex, Inc.

[22] Filed: July 28, 1970

[21] Appl. No.: 58,762

[52] U.S. Cl. ........................235/61.11 E, 235/92 CC

[51] Int. Cl. ..........................................G06k 7/10

[58] Field of Search .................235/61.11 E, 61.11 F, 235/92 CC, 61.11 D; 340/146.3 K, 146.3 Z; 178/113

[56] References Cited

UNITED STATES PATENTS

| | | | |
|---|---|---|---|
| 2,612,994 | 10/1952 | Woodland et al. | 340/146.3 K |
| 3,225,175 | 12/1965 | Hyypolainen | 235/61.11 E |
| 3,238,501 | 3/1966 | Mak et al. | 235/61.11 E |
| 3,359,405 | 12/1967 | Sundblad | 235/61.11 E |
| 3,417,234 | 12/1968 | Sundblad | 235/61.11 E |
| 2,870,429 | 1/1959 | Hales | 178/113 |
| 3,309,667 | 3/1967 | Feissel et al. | 235/61.11 F |
| 3,586,836 | 6/1971 | Paul | 235/92 CC |
| 3,617,707 | 11/1971 | Shields et al. | 235/61.11 E |

*Primary Examiner*—Thomas A. Robinson
*Attorney*—Arthur J. Plantamura

[57] ABSTRACT

A novel data processing means is provided comprising a technique for scanning a coded document in which the code appears as a row of printed lines of substantially equal length. The spaces between the individual lines in the row are of predetermined widths. These lines, in combination with the associated spaces of different widths constitute, for example, a binary code that is registered through a photosensitive system, i.e. a handheld reader which is drawn along the length of the document. The reader is characterized by its simplicity and absence of any moving parts; it has an extremely broad tolerance and produces a valid readout so long as it scans, i.e. crosses, any part of the line. Orientation of the reader during its scan stroke is immaterial; it may be held on any side. The reader has an area spot resolution which is no greater than the width of the thinnest space in the code grouping. Command signals, and logic circuits determine the character of the encoded digit under observation through the reader which has a self-contained source of illumination for the lines and spaces on the document. In response to line activation, the logic system displays a degree of self-learning that enables it to adjust to varying scan speeds and nevertheless decode the array with great accuracy.

19 Claims, 10 Drawing Figures

FIG. 1
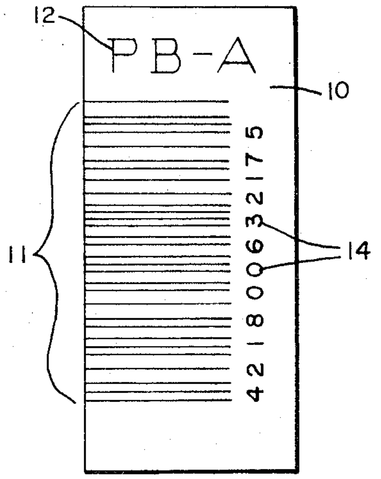
FIG. 2
| DIGIT | BINARY NOTATION | | | | |
|---|---|---|---|---|---|
| 0 | I | I | O | O | O |
| 1 | O | O | O | I | O |
| 2 | O | O | I | O | O |
| 3 | O | O | I | I | O |
| 4 | O | I | O | O | O |
| 5 | O | I | O | I | O |
| 6 | O | I | I | O | O |
| 7 | I | O | O | O | O |
| 8 | I | O | O | I | O |
| 9 | I | O | I | O | O |
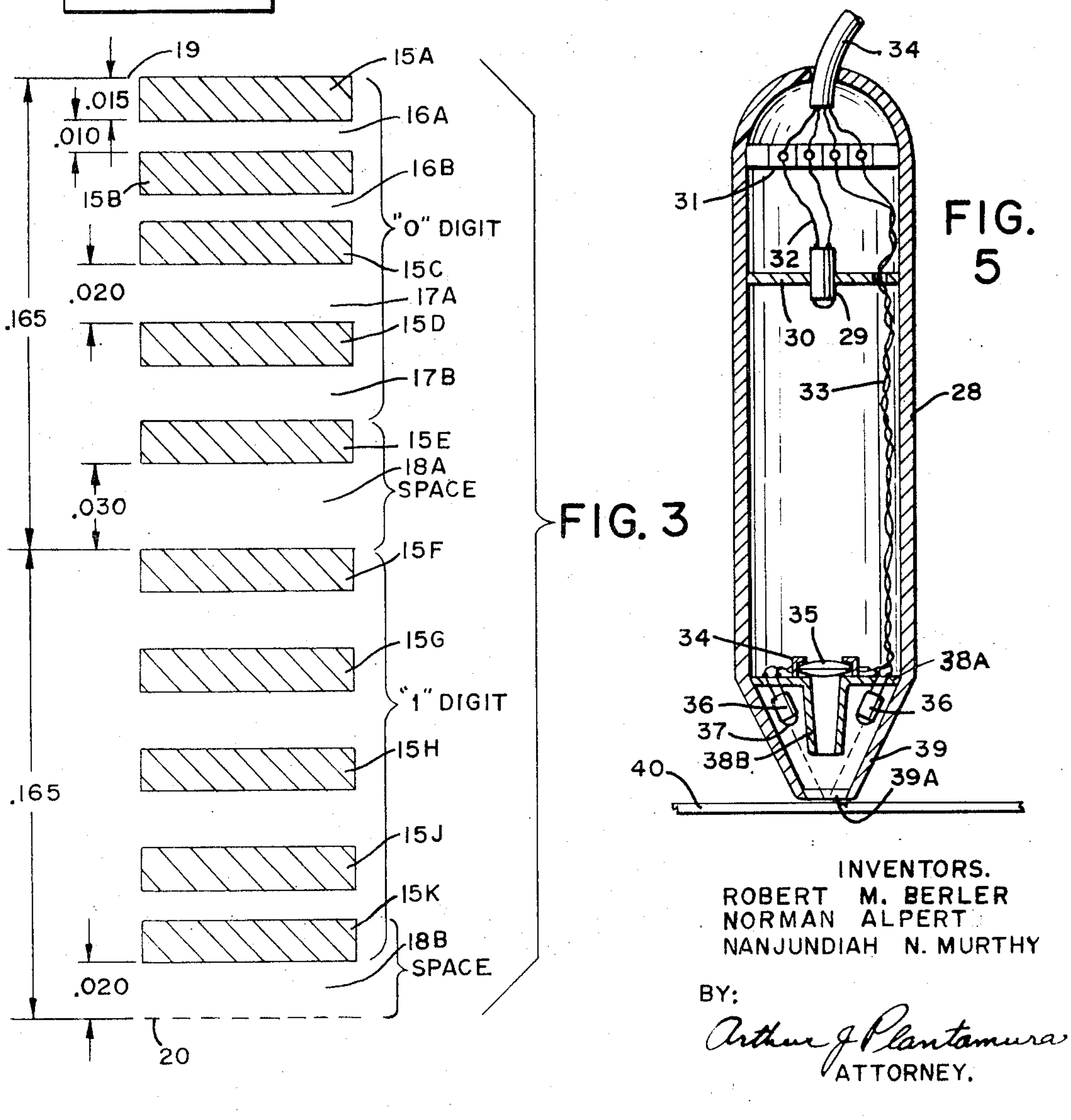
FIG. 3 FIG. 5
INVENTORS.
ROBERT M. BERLER
NORMAN ALPERT
NANJUNDIAH N. MURTHY
BY:
Arthur J Plantamura
ATTORNEY.

INVENTORS.
ROBERT M. BERLER
NORMAN ALPERT
NANJUNDIAH N. MURTHY
BY:
Arthur J. Plantamura
ATTORNEY.

ROBERT M. BERLER
NORMAN ALPERT
NANJUNDIAH N. MURTHY
*INVENTORS.*

BY Arthur J Plantamura
ATTORNEY.

ROBERT M. BERLER
NORMAN ALPERT
NANJUNDIAH N. MURTHY
INVENTORS.

BY: Arthur J. Plantamura
ATTORNEY.

DATA PROCESSING SYSTEM AND READER THEREFOR

BACKGROUND OF THE INVENTION

This invention relates to a novel data processing means and, more specifically, to a hand-held optical reading device with an associated code and the like.

Over the years, a considerable amount of effort has been expended in attempts to simplify and increase the reliability of a variety of codes and associated code "readers".

For example, in retail merchandising, there are at present several types of coded tickets that are mechanically or optically read to provide information in an automatically collectible form. Punched tickets and printed mark tickets are, perhaps, two of the most common of these merchandising systems.

Punched ticket data is encoded through a series of precisely registered perforations that are decoded or read by either mechanical or optical devices. For decoding purposes, the reading device references are established by means of special holes or edges formed in the tickets. Ordinarily, the tickets are affixed to articles of merchandise. When the merchandise is sold, the tickets are manually removed and spindled for inventory control, billing or other subsequent processing. Duplicate tickets, left on the merchandise, are personally decoded by the sales clerk in order to prepare a sales check.

Printed mark ticket data are encoded in the form of impressed characters. Reliability of the decoding or readout from tickets of this sort frequently leaves much to be desired. For example, orientation of the reader and registration of the ticket in the reader are extremely important to produce a valid readout with documents of this kind. Moreover, in general, systems of this kind are usually awkward and cumbersome. Additionally, both the punched and the printed tickets are relatively expensive and difficult to prepare without the use of special equipment.

SUMMARY OF THE INVENTION

In accordance with the invention, an improved code and reader combination of a novel character is provided that largely overcomes these prior art deficiencies. More particularly, a specific embodiment of the invention comprises a document of the kind which may be suitably attached to merchandise and has a series of spaced lines; one or the other or both of the lines and the spacing between these lines is adjusted so that a combination of lines and spaces constitute a code, as for example, a binary coded decimal system. The associated reader deciphers the code as the reading device is moved across the combination of lines and spaces. These lines and spaces are focused into a photocell sensor by a lens system, both of which are contained within the reader. Also contained within the reader is a light source which provides the illumination for the lines and spaces which are printed on the document. The light source which may be one or more lamps to provide light directly or other lighting arrangement, e.g., a fiber optics system, projects a spot of light out through the small opening in the end of the reader. When the reader is placed against the document, this opening will permit the light source to illuminate the lines or spaces which pass under this opening as the reader is stroked over them during a document scan. Through this same opening, the lens in the reader will in turn form images of these lines or spaces onto the photocell sensor as it passes over them. The invention will be described in detail primarily in connection with the embodiment which comprises a row of lines of substantially uniform thickness in combination with spaces between the lines which vary in size—this variation in size of the spaces being used as the encoding mechanism. However, it will be apparent, as the invention is described hereafter, that the space may be uniform and the line widths may be varied within controlled dimensions. Additionally, because of the self-learning capability both line and space thickness may be varied providing a relative proportionate thickness of line and width of space is maintained to produce readout translatable into an intelligible information.

The document of this invention which comprises a combination of lines and spaces is unconventional in the following ways.

The line and space groupings as printed on the document are not in a binary coded form. The document must be decoded in the logic networks to yield the encoded binary notation of various digits. The lines of the document serve two purposes. First, each line serves as a clock or synchronizing mark only, not as a bit of a binary code decimal notation. Secondly, it serves as a combination clock mark and a ONE bit of a binary code.

Whether it serves the first or second of these two purposes depends on the width of the space between these lines. When the space is a narrow one, the line following the narrow space will have the dual role of acting as a clock mark and a ONE bit. In the case where a wide space separates two lines, the second line will not serve as a ONE bit; instead it will continue to act as a clock mark. In this case, the wide space will become the ZERO bit in the combination of bits which comprise the coded digit.

This system is especially useful in discount houses and department stores where an unskilled sales clerk can quickly extract data from a merchandise ticket or tag and enter it directly into a computer for processing. The reading capability is essentially independent of speed of movement, i.e., data extraction, moreover, may be accomplished in a fraction of a second by rapidly moving a hand-held reader across the tag in question with a motion similar to that of striking a match on a match box cover or it may be read by a more leisurely, or even erratic, movement. The hand-held reader orientation relative to the document has no effect on the ticket readout.

Typically, a ticket-type document in accordance with the invention may take the form of a piece of paper that is 1 inch wide and 1 to 3 inches long, depending on the number of digits which must be encoded. For example, the machine readable portion of the document may conveniently consist of a band of lines and spaces about three-fourth inch wide and 1 to 3 inches long. A remaining ¼ inch width of the document may be used for a printout of the decoded numbers in conventional Arabic numerals adjacent to the coded line pattern equivalent. To produce one of these tickets, the Arabic numerals and the equivalent line code, which preferably will be arranged on the same type bar, may be printed out on the tag simultaneously by the printer. This eliminates the possibility of error in the code and in the readable number.

This invention has the distinct advantage that the document may be printed out in one color on a contrasting substrate, e.g., by use of black lines on white paper.

As already indicated, each of the printed lines, when taken with the reader, acts as a combination clock and data signal. The printed line thus serves two purposes simultaneously: (1) it acts as a clock to indicate that information will follow within a prescribed time, which depends on the reader scan rate over the document; and (2) it functions as a ONE data bit for the binary code decimal system when it is sensed by the reader during a command or strobe examination signal, said signal being generated as the reader senses the passing from view of a preceding printed line. Taking a specific illustration, the lines may be, for example, each three-fourth inch long and have a line thickness of 0.015 inches. These lines, which preferably are black, are separated from each other by white spaces that are one of three different widths. Typical widths, for example, might be 0.01 inch, 0.02 inch, and 0.03 inch, depending on whether the bit is, respectively, a ONE, a ZERO, or a space between coded digits having only a single or two ONE bits in the digit; if the digit has two ONE bits, the space between digits is 0.03 inch.

It will be understood that the dimensions of the lines and spaces are not restricted, i.e., the lines may be made more coarse or more fine depending on how many digits per inch of the document are required. The above dimensions will yield approximately six digits to the inch. Making the lines and spaces more coarse decreases the number of digits per inch. Considered from another viewpoint, for a given group of digits, the document with the coarse lines will be longer. Line thickness moreover depends on two factors. The first is determined by the minimum separation that can be established between two lines without causing the ink to run and obliterate the space, as well as the minimum width of a line that can be printed on inexpensive paper. The other limiting factor involves the resolution of the reading device. The reading device, for instance, must distinguish between the narrow lines and spaces and also receive sufficient light return from a rather small area to provide essential signal stimulation.

This invention is further unique in that because the document is scanned by moving a hand-held reader over the coded array, i.e., over a row of spaced lines, the rate of scan can vary. In fact, the rate of scan usually will be different from one scan to another. The scan rate, moreover, will often not be linear, but also will vary during the scanning motion. Because of this situation a rate or clock signal originating entirely in the reader equipment would not conform to these different scan rates, in accordance with a feature of the invention, the initial clock or synchronizing signals come from the coding on the document. In this way, the logic system "learns" the scan rate as the reader sweeps over a line or bar. If at the end of the countdown, (which is equal to the up count), i.e., at the time of interrogation, the reader senses a space, a ZERO bit is registered; if, instead, the reader senses a black mark, a ONE bit is registered. Stated another way, if it takes a longer time to sweep across the adjacent space than it did to cross the preceding bar or line, a ZERO bit is registered; a shorter time indicates a ONE bit. The space between digits is not critical provided that it is at least equal in width to a space which generates a zero or larger.

Single point light pick-up is used for the reader, inasmuch as it must be able to orient in any direction without affecting the ability to read a document. Preferably, a single photo sensor is used to respond electrically to the light stimulation from the document. Typically, when scanning a binary coded decimal array, the system is able to determine if the coded band and space array represents a ZERO, a ONE, or a space.

The coded band can be adapted to any digital system or notation. It has been found that the most practical arrangement is a binary coded decimal notation. The particular code chosen for the purpose of illustration is the 1-2-4-7 binary notation. In this code, not more than two ONE bits will appear for any digit in a decade. Each digit, moreover, will require the same length and space on the document for encoding purposes, and thereby ease the printing problem.

For a more complete appreciation of the invention, attention is invited to the drawing and detailed description, the scope of the invention being characterized by the claims.

BRIEF DESCRIPTION OF THE DRAWING

FIG. 1 is an illustrative representation of a coded document in which the code comprises an assemblage of lines and spaces in accordance with the principle of the invention;

FIG. 2 illustrates a suitable binary coded decimal notation which may be employed in the system of the invention;

FIGS. 3 and 4 represent in enlarged detail portions of a typical binary coded decimal system, in the form of an array, i.e., a row of lines and spaces, for use in connection with the invention;

FIG. 5 illustrates diagrammatically a preferred form of hand-held reader that may be utilized in practicing the invention.

DESCRIPTION OF THE PREFERRED EMBODIMENTS

Figure 4:
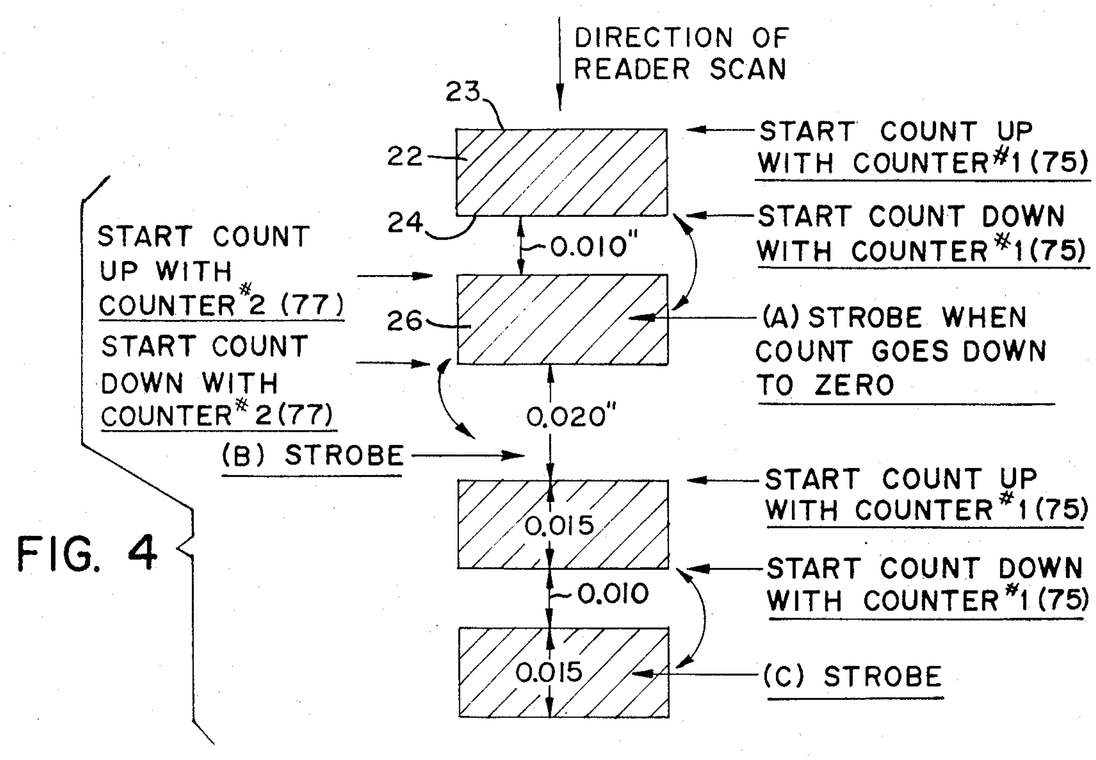

In order to afford a full understanding and appreciation of our invention, the method by which information is recorded on documents used in connection with this technique will first be described. For this purpose, reference is made to FIG. 1 through FIG. 4 of the drawing.

As shown in FIG. 1, a document or ticket 10 has a shape and general arrangement similar to coded merchandise tickets. In addition to a printed code 11 which comprises a row of lines and spaces, the ticket 10 also carries a suitable printed label or other identity 12 and Arabic numerals 14 that correspond to the data that characterizes the code 11. The binary notation as has been indicated may be any suitable binary coded system. In particular, the invention will be described in conjunction with a modified 1-2-4-7 binary notation illustrated in FIG. 2. With this code, no more than two ONE bits are needed for any digit in a decade. Also, by use of this arrangement the same amount of space is used for each digit—this will be described hereinafter in describing a preferred embodiment of the invention.

In order to conserve further space, the 1-2-4-7 code is modified in the following way. The normal code for the digit zero is 0 0 0 0. The code was modified so that the digit zero becomes 1 1 0 0 and all the remaining digits in the decade remain unchanged. It should be noted that this modification to the conventional code saves space because a one takes up less space than a zero. Referring to FIG. 2, each digit utilizes four bits, i.e., the first four columns. In accordance with a preferred embodiment of the invention, however, a code which contains one extra bit, i.e., a fifth bit is used as shown by the fifth column of FIG. 2. Thus, as encoded, each digit is arranged to contain five bits; this last bit always is encoded as a ZERO bit. The fifth bit serves a twofold purpose: first, it makes it possible for each encoded digit in the binary notation of the 1-2-4-7 code to occupy the same amount of space on the document—an important feature from the standpoint of the printer. Secondly, this ZERO bit in the fifth column will act as a space that separates one encoded digit from the next successive coded digit. Thus, for example, the digit 5 will be encoded as 0 1 0 1 0, the digit 7 as 1 0 0 0 0, etc. This arrangement makes the spacing between digits noncritical which is also an important consideration from the printing standpoint. In other words, each digit may be printed separately since the inter-digit spacing is noncritical. The logic system, to be described subsequently, is organized to respond to the first four bits of the digit code and treats the fifth bit as a space or separation between encoded digits.

Referring to FIG. 3, a portion of a representative document encoded in accordance with the invention is shown in greater detail. In that figure, the encoded digits ZERO and ONE are illustrated in accordance with the representative code. It should be noted that the dimensions shown in FIG. 3 as decimal fractions of an inch, are for illustrative purposes only in order to show a typical code spacing. The dimensions are not to be construed as a limitation or other restriction on the scope of the invention since it is the relative change in space (or line) width which is translated into the binary notation and which in turn is decoded electronically into human readable intelligence.

Typically, each printed or inscribed bar 15 may have a thickness of about 0.015 inch wide, the narrow space 16 between any adjacent pair of bars being about 0.01 inch wide and the wider encoded space having a width of about 0.02 inch. The last space at the end of each coded digit will be either 0.03 inch wide as shown as space 18A or 0.02 inch wide, shown as space 18B (FIG. 3). The last coded digit space width depends on whether there is one or two ONE bits in the digit. If there are two ONE bits in the digit, less space is used so that a 0.03 inch space is used 18A; if only a single ONE bit is found in the digit, a 0.02 inch space is used, 18B. In every case, the entire space necessary to encode any digit plus one space, will always total 0.165 inch. Thus for the dimensions chosen in FIG. 3, each encoded digit will take up about one-sixth of an inch, or one-half the distance between parallel lines 19 and 20. Accordingly, the coded digit density on the illustrative document will therefore be six digits per inch. Reading downward from the top of FIG. 3, the topmost three lines or bars 15A, 15B and 15C establish 0.01 inch spaces 16A and 16B that represent the first and second ONE bits in the code for a zero digit. The next two lower bars 15D and 15E establish two 0.02 inch spaces 17A and 17B that represent the last two ZERO bits in the code for the number zero. The 0.03 inch space 18A formed between the two successive bars 15E and 15F distinguish a space between coded digits. The space 18A is 0.03 inch in this digit which has two ONE bits. However, in a digit which has but one ONE bit this spacing between digits (as with space 18B, FIG. 3) would be 0.02 inch. This arrangement provides equal spacing per digit for maximum density of code per space utilized. However, where maximum density is not required, this spacing can be expanded provided, however, that for the illustration given, it is at least 0.03 inch to afford adequate digit separation in each case. The coded digit ONE which comprise the bottom five lines and spaces in FIG. 3 can be read in the manner employed in reading the top five lines, i.e., with those spaces between 15F, 15G, 15H, 15J and 15K which have the same width as 16A designating a ONE bit while those spaces having the width of 17A designating a ZERO bit.

FIG. 4 illustrates features of the document and the system logic that is used to read out or decode these markings. Each mark or line functions as a clock mark. Following each mark, the logic system will determine if the data is a ZERO bit, a ONE bit or a space, depending on the width of the space between the clock mark and the next successive mark. An important feature of the invention resides in the adaptability of the logic to different as well as changing scan rates as the reader, which will be described subsequently in more complete detail, is drawn across the code. Without regard to the scan speed, the system will adapt itself to each change.

The mechanism underlying the functioning of the code will be further described by reference to FIG. 4 which shows a representative portion of a code of the kind contemplated by the invention. Illumination reflected from the document under observation causes the reading device to sense the leading edge or initial portion 23 of a mark 22 as the reader passes over the mark. As the beginning 23 of mark 22 is sensed, it starts one of two available counters to begin counting "up" at a predetermined rate. As the reader progresses over the row of marks in the direction of scan, it senses the end portion or trailing edge 24 of the mark 22; the counter will then count "down" at the same rate. When the counter reaches ZERO, it generates a command to a circuit to put out a strobe pulse to interrogate the logic and determine whether a line or space is in view. If during this interrogation, the device is positioned over another mark 26, this situation is registered by the reader and applied to the system logic. The logic responds to this input stimulation (i.e. that a mark has been detected) by indicating that a ONE bit has been detected. If on the other hand, on counting down to zero the strobe command is executed and the reader fails to sense a mark, the system logic responds to this information by indicating a ZERO bit. For instance, strobe A (FIG. 4) which commences over, i.e., senses, the mark 26 is interpreted as a ONE bit; strobe B, which is generated as the sensor is over a space is interpreted as a ZERO bit; strobe C, which commences over another mark, is interpreted as being a ONE bit.

It is seen from the foregoing, that each line tells the logic that a bit of information will follow. For example, a binary number of "0 0 0 1 0" representing the digit ONE (as shown by the lower five lines and spaces of FIG. 3) will be in the following form:

| | | |
|---|---|---|
| 1st line | | |
| | Wide space | 0 bit |
| 2nd Line | | |
| | Wide space | 0 bit |
| 3rd Line | | |
| | Wide space | 0 bit |
| 4th Line | | |
| | Narrow space | |
| 5th Line | | 1 bit |
| | Wide space | 0 bit |

In this binary number, the fifth line served as combination clock mark and also a ONE bit. All other lines served only as a clock mark alone. Note that a narrow space preceded the fifth line that served this dual purpose.

All wide spaces decode into a ZERO bit. The last ZERO bit may be a standard size wide space (0.02 inch) or an extra large wide space (0.03 inch or more). The narrow space, i.e. that space between lines 15J and 15K of FIG. 3 has no bit information itself. As has already been noted, the space between adjacent digits in this document can be either 0.02 inch or 0.03 inch wide depending on whether the preceding digit had one or two ONE bits in it. A digit containing two ONE bits in it takes up less space than a digit containing one ONE bit. Therefore, the space left over will be greater for the digit with two ONE bits in it. Since each digit takes up a total space of 0.165 inch in the illustrative example referred to, the digit containing two ONE bits will have a space between it and the next digit of 0.03 inch. (Space 18A, FIG. 3). The digit with one ONE bit in it will have a space left over of 0.02 inch; this space is actually the fifth bit of a digit, which is always a ZERO bit. The size of this space is noncritical providing that it is not less than 0.02 inch, i.e. it may be 0.02 inch; it may be 0.03 inch, or it can be greater than 0.03 inch. Of course, it should be noted that these dimensions apply to this particular illustrative code assemblage of lines and spaces only. It will be apparent that the printed code may be even smaller and can be scaled up to larger dimensions assuming the line and space format is kept in proportion to produce an intelligible code.

As hereinbefore mentioned, two counters are used in the practice of the invention. Illustratively, when the first counter is counting down to zero after first having counted up, another mark might be sensed by the reader before the first counter has completed counting down to zero. Hence, when one counter is in use, the other waits in alternate sequence. As each mark is sensed by the reader, it will activate either one counter or the other.

This system is characterized by a "self-learning" capability, a feature which enables the invention to function at different and changing scan speeds. Typically, a self-learning system of this sort may use a continuously running oscillator that sends a train of pulses through a gate to a counter. The gate is enabled, however, and will pass these pulses to the counter when the leading edge of a mark stimulates the reader to generate a gating pulse. During the time that it takes for the reader to pass across the mark, the counter adds, stores, counts, or otherwise remembers the oscillator pulses, which occur at a suitably high rate, or frequency. The reader on detecting the trailing edge of the mark, disables or closes the gate and the system logic commands the counter to count back to zero. Because the system frequencies are fixed, the down count rate is the same as the up count rate. Thus, the time required for the counter to count up as the reader passes over a mark fixes the length of time that it will take for the counter to count back down to zero. At the zero point, the strobe of the logic, i.e. the command to interrogate, occurs regardless of the reader scan rate of movement. A slow reader scan allows the reader to take a longer time to pass over the mark. The counter will necessarily count up to a higher value during this longer time. The reader, when passing off the mark terminates the up-count and initiates the down-count. Consequently, the strobe command occurs when the down count reaches zero, whether the reader is drawn slowly or quickly over the document. Even when the reader is drawn over the document at a non-linear rate, the system will adapt to the rate of each mark scan. For the worst case condition, a mark (0.015 inch) and a wide space (0.03 inch) combination covers a length of 0.045 inches. If the scanning speed of the reader changed as it was drawn over a document, it would not change substantially over the 0.045 inch distance. Each time a mark is swept over by the reader, the counter learns the new or different scan rate by storing a new accumulated value in the counter. In this way, the system logic adapts to varying scan rates.

Figure 6:
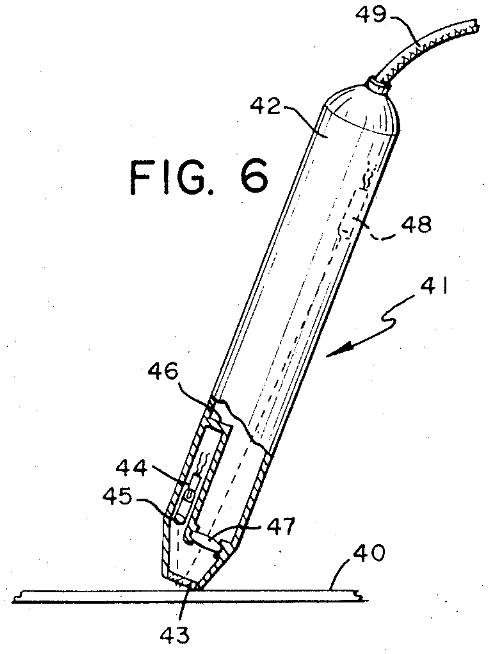
FIG. 6 illustrates diagrammatically an alternate form of reading device that may be used in connection with the invention.
Figure 7:
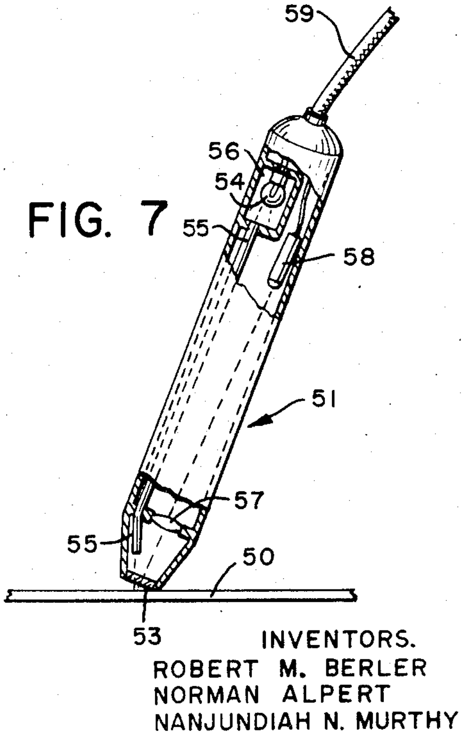
FIG. 7 illustrates still another form of reading device that may be used in connection with the invention.

Readers of the type which may be advantageously employed in practicing the invention are depicted diagrammatically in FIGS. 5, 6 and 7. Each of the units shown is designed so as to be light in weight yet rugged and conveniently manipulated by hand. Referring to the unit of FIG. 5, it comprises a light tight housing 28 which terminates in a conical tip portion 39 which has formed at the end thereof an opening 39A through which the printed intelligence to be picked up from the document 40 is transmitted. Mounted internally near the tip of the reader is a combination light baffle, lens and light source support which comprises a lens enclosure or cell 34 for the lens 35, a horizontal portion 38A and a conical portion 38B whose opening is aligned with the lens 35 and the photoelectric sensor 29. The baffle arrangement 38A and 38B prevents light from lamps 36 from entering directly to the photo sensor 29. The photo sensor is held in place on a suitable support 30 and connected through wires 32, the wire terminal strip 31 and the cable 34, to a suitable data processing system (not shown). Also connected through the wire terminal strip is the wiring 33 to the light source 36. While a single lamp 36 may be sufficient it is preferred to use a system of multiple lamps, preferably at least three lamps. Multiple lamps provide greater light intensity and offer assurance against malfunction from lamp failure. For example, when three lamps 36 are employed, they are spaced around the light baffle at 120° intervals; this provides more even lighting on the document 40 regardless of the angle which the reader presents to the surface of the printed document 40 such as when it is held between the fingers of a user in a manner similar to that used in holding a pencil. Lamps 36 with lens tip 37 are preferably used to concentrate the light to a bright spot on the document. In the case of three lamps separated by 120°, light afforded by three lamps produces three bright spots which overlap and merge into one spot on the document 40.

Referring to FIG. 6, an alternate form of handheld optical reader, typical of a device that may be employed in reading the coded document described hereinabove is shown diagrammatically. The size and shape of this reader (as with the reader of FIGS. 5 and 7) is preferably in the general form of a stout, pencil-like shape with a flexible cable extending from the upper end. The lower end has the general shape of a blunt point with an opening formed in it for the purpose of allowing the lines of the code to be viewed by an internal photocell in the reader through a suitable optical or lens system. A light source also is housed internally in order to illuminate the area of the document being viewed, through the opening that is formed in the blunt end of the reader.

In order to resolve the line and space pattern on the coded printed document as discussed hereinabove, the reader is designed to have an area spot resolution that is equal to, or smaller than the width of the thinnest line or space. For example, in the case considered above, the thinnest space is 0.01 inches thick. Consequently, the reader resolution should preferably be about 0.0075 inches in diameter. An aperture of about this size will provide sufficient illumination to reliably operate the photocell. The illumination of the spot area, moreover, may be done either through direct illumination from one or more lamps with a lens to focus the light to a spot, or by means of "fiber optic" light pipes with the lamp and lens system, in which the lamp has a lens built into a part of the glass envelope. FIG. 6 utilizes a lamp with a built-in lens; FIG. 7 uses fiber optics or light pipes.

Referring in particular to FIG. 6, the reader 41 comprises a housing 42 that is capable of excluding stray light from the housing interior as well as to contain all of the functional components needed to read the coded document. When in use, the reader 41 is stroked over a coded document 40 so that the reading aperture 43 passes over the line and space combination printed on the document 40. A self-contained long life lamp 44 is equipped with a lens 45. The lens 45 directs the light from the lamp 44 through an opening 43 and focuses the light on the printed data to be read from the document 40. A light tight enclosure 46 around the lamp 44 confines the light and prevents interfering stray light from passing through to the photocell 48. Light reflected from the coded information is sent through the opening 43 and is imaged by the lens 47 into the photocell 48. The photocell 48 responds to this stimulation by sending an electrical signal that is related to the light intensity through the cable 49. Power to lamp 44 is also supplied through the cable 49.

The reader 51 of FIG. 7 utilizes a fiber optic light pipe 55 to channel light from a lamp 54 onto the appropriate area on a document 50. The light 54 is otherwise confined in a light tight box 56. The printed coded data from a document 50 is imaged by a lens 57 onto a photocell 58. Electrical power for the lamp 54 is supplied by flexible cable 59, which also transmits signals from the photocell 58 to the logic system. The light impulses, i.e. detection of lines and spaces, are processed through an amplifier and a decoder (not shown) in order to produce the signals suitable for processing in a computer.

While the readers of FIGS. 5, 6 and 7 are designed primarily for holding in the hand and moving them in a scanning operation over a coded document, it will be understood that these readers may be mounted so as to be stationary while the coded document to be read is moved relative to the reader instead.

The imaging lenses in these readers may comprise a simple achromatic convex lens or it may be a compound lens system, if required. The choice of the particular lens system depends upon physical size limitations of the reader and the needed magnification. The election of direct lamp illumination (FIGS. 5 and 6) or light piped down by means of the fiber optics (FIG. 7) may depend on physical and mechanical considerations for the reader configuration. These factors, however, do not significantly influence the principle of operation of the system under consideration. The choice of photo sensor will be determined by sensitivity to the anticipated illumination intensity, color sensitivity, and speed of response.

Figures 8, 9:
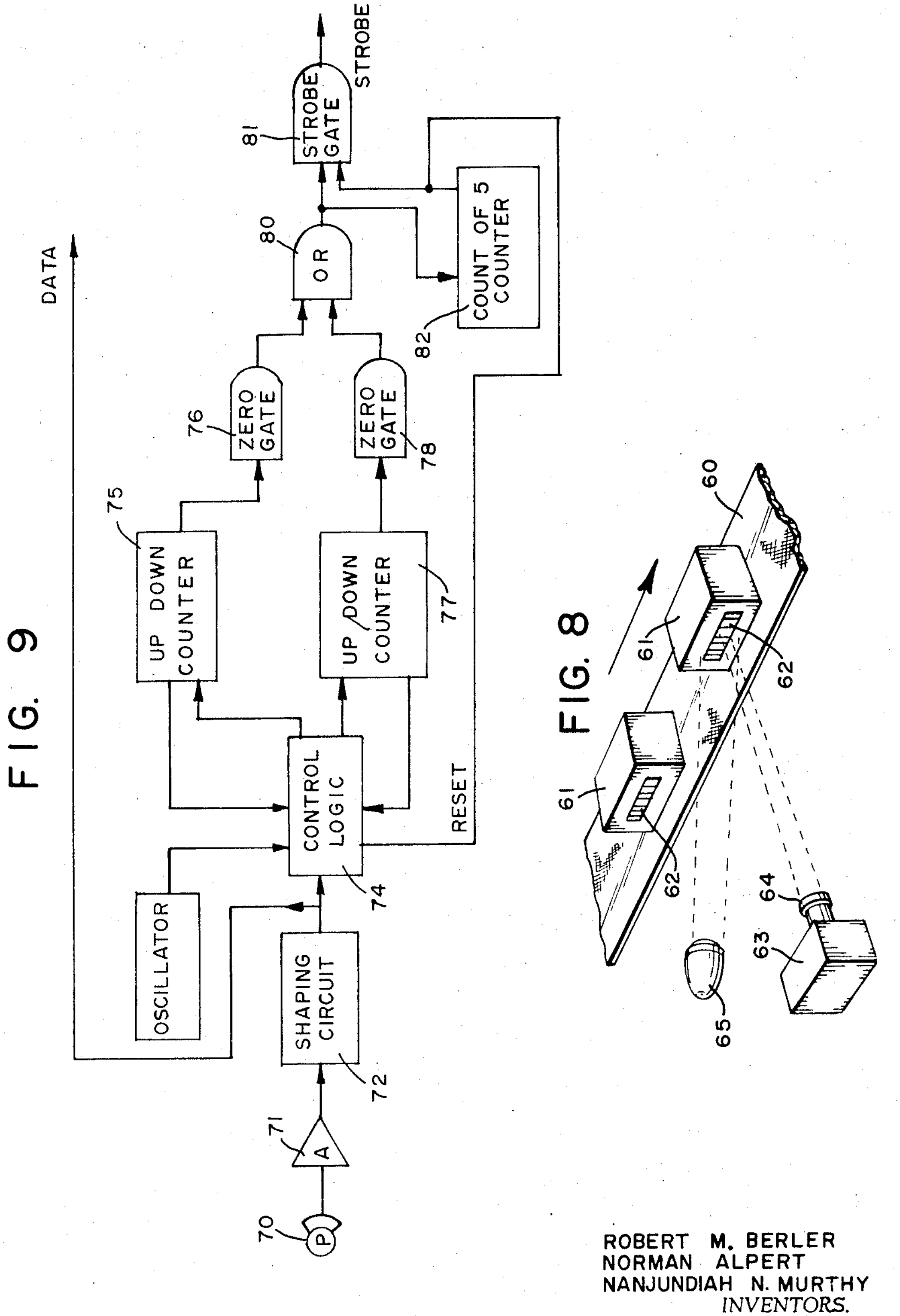
FIG. 8 illustrates diagrammatically yet another form of reader, as well as the capability of the system of the invention to read coded intelligence from a location remote from the reader.
FIG. 9 is a block diagram of typical logic used in connection with the invention.

Among the various advantages of the invention is the capability that this type of document can be read out at a substantial distance from the reader, i.e. with a reader not in contact with the document. The reader, for example, may be a few feet removed or even many yards from the coded document to be read. By using a "-telephoto" type lens either incorporated in the reader or in conjunction therewith as shown by reference to FIG. 8, a document 62 can be optically brought close to a reader 63 although it may be inches or feet away from it. FIG. 8 depicts an illustrative use of this kind. As shown, a container 61 containing a code 62 affixed thereon is carried on a conveyor belt 60 past a fixed reader 63. The reader 63 with a telephoto lens 64 is aimed so as to scan the code 62 on the box 61 as it passes by. An external spot light 65 may be used to illuminate the region where the box will pass when it comes into optical range of the reader. Such a document would, of course, preferably be printed out in larger dimensions, however, the format is essentially one comprising an assemblage of lines and spaces as hereinabove described.

In addition to usage in merchandising and inventory control in the retail and wholesale trades, the invention finds important utilization in many other areas such as:

vehicle identification, both automobile and railroad rolling stock;

Post Office mail processing, zip code application and freight handling;

credit card processing;

library cataloging by affixing the code to the cover of volumes;

Patent Office cataloging, e.g. by printing a classification code on the patent;

ticket reservation processing for airlines and theatres;

bank accounts, e.g. to identify savings as well as checking accounts;

in manufacturing plants, e.g. to aid routing parts identified with the code to assembly destinations.

Additionally, the code may be modified so that the lines, of the line and space format, are composed of magnetic substance so that the code responds instead to magnetic rather than optical sensors.

FIG. 9 is a block diagram of a typical embodiment of the system logic used in the practice of the invention. The signals from the photocell 70 are amplified by amplifier 71. The amplified signals are shaped by a Schmitt trigger circuit 72. For purposes of illustration, an assumption is made such that every time the photocell 70 sees a black line or bar on a printed document, the output signal from the shaping circuit 72 is positive. A control logic block 74 responds to this positive signal by selecting an up-down counter 75 (counter No. 1) to start counting. The control logic block 74 keeps counter No. 1 in an up count until the black bar (or pulse) disappears from view by the reader. At this point, the control logic 74 reverses the count on counter No. 1 and causes it to count down to zero. When the counter reaches zero, the zero gate 76 of counter No. 1 (75) applies a strobe or command pulse through an OR gate 80 to a strobe gate circuit.

If a second black bar on the coded document comes into the view of the reader while counter No. 1 (75) is counting down, then the control logic 74 directs a second up-down counter, counter No. 2 (77) in combination with zero gate 78 to perform the same function as counter No. 1 (75). Thus, a second strobe signal for the second black bar is generated at the strobe gate circuit 81. The strobe signals from both of the zero gates 76 and 78 are sent through the OR gate 80. Because there are five strobes to a digit, as described in conjunction with FIG. 2, the last bit in every digit has to be discarded. This is done by means of a five-count counter 82. Counter 82 functions so that it registers the fifth strobe pulse and disables the strobe gate circuit 81 in order to clock the strobe pulse. The five count output also is used to reset the control logic functions to the start position. Thus, at the end of a character, the control logic 74 is ready for the next character code.

Figure 10:
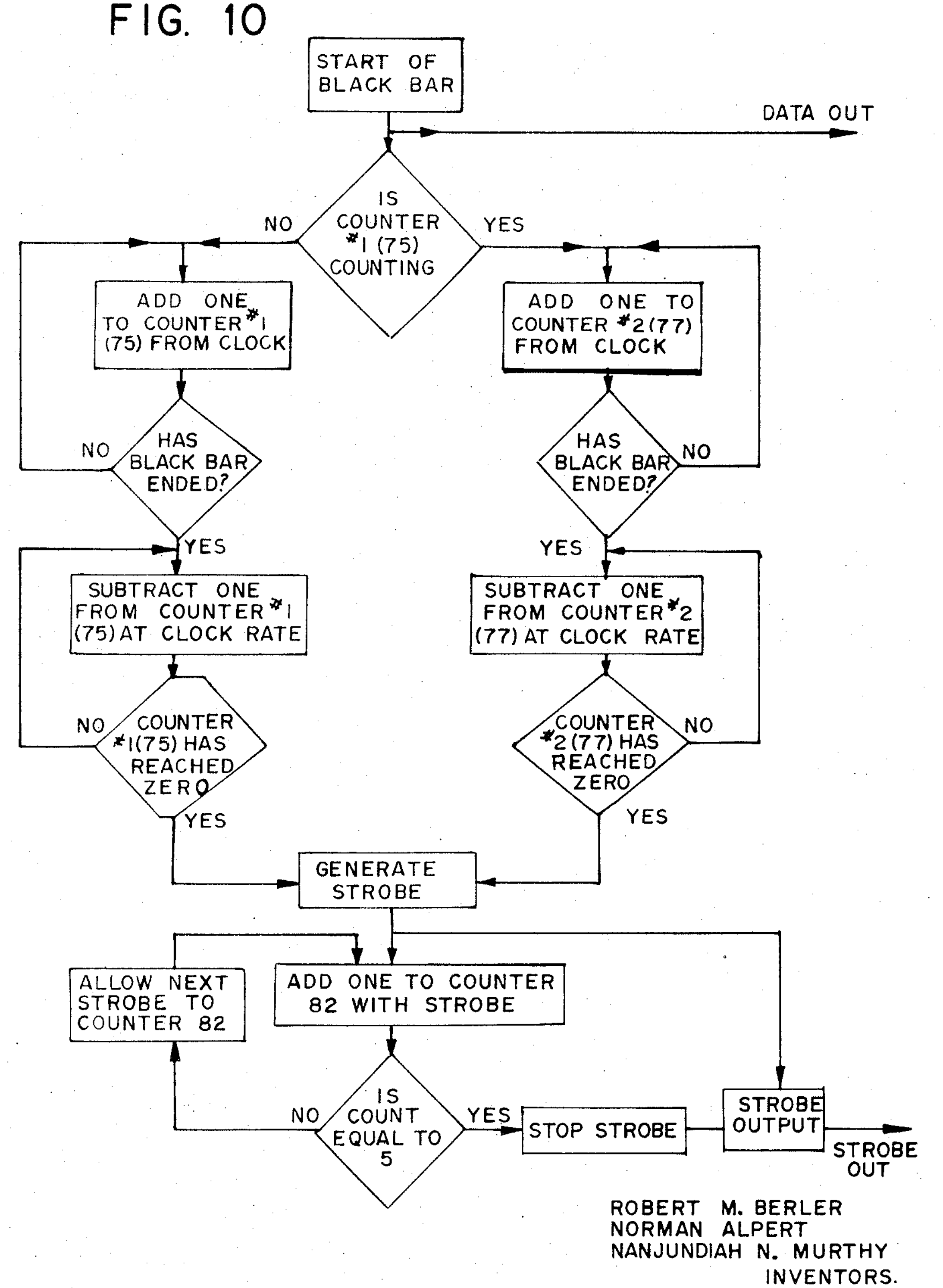
FIG. 10 is a simplified flow diagram illustrating principles of the system.

FIG. 10 shows a simple flow diagram of the system just described. It should be noted that if one of the counters runs out of counts in the forward or up-count direction (i.e. operator is moving the reader too slowly over the document) this would then constitute a "no-go" condition and the logic will be completely disabled until the operator repeats the whole operation again. This is not shown in either of the two diagrams.

At the start of a black bar, counter No. 1 (75) commences operation by receiving one pulse from the oscillator or clock. If the black bar has not ended, counter No. 1 (75) continues to register clock pulses until the black bar ends. As the reader moves into the space between adjacent bars and the response to the inquiry "Has the black bar ended?" is affirmative, pulses are subtracted from counter No. 1 (75) until the counter reaches zero. A zero counter condition generates a strobe pulse or interrogation signal that is gated out to the logic interrogation circuit as well as to the count of 5 counter 82. As long as the strobe pulse count is less than five, the strobe pulses continue to gate out for logic interrogation. At the count of five strobe pulses, however; the strobe output pulses are stopped.

Counter No. 2 responds in a similar manner, but, as shown in FIG. 10, the counter No. 2 is activated only when counter No. 1 also is running.

As has been noted, the essence of the coding system of the invention resides in the proportionate line and space size relationship. For example, in the case of a printed bar or line of uniform thickness relative to the adjacent space width which vary in size, the bar should be wider than the width of a space that identifies one of the coding bits. The bar also should be narrower than the adjacent space that identifies another coding bit. In this manner, the clock ordinarily will issue a strobe pulse as the reader is in a space or sweeping across a printed bar, depending on the separation between successive bars, depending on the nature of the coded character.

The printed bars or lines, if practical in some applications, may themselves also be used to store coded information. For instance, rather than a solid bar, the clock up counting and down counting can be initiated by an array of coded characters that have a sufficient contrast relative to the adjacent space to cause the reader photocell to induce the appropriate clock response as it scans over these lines.

The system need not rely on stimulation through characters or indicia that are within the visible portion of the electromagnetic spectrum but can use other techniques of which magnetic inks, magnetic tapes and punched paper data storage means are typical.

It will be apparent to those skilled in the art that various modifications may be made in the system set forth without departing from the scope of the invention. For example, while the invention has been described in conjunction with a format in which the lines are essentially of equal width and the spaces are varied in width—and this is the preferred format, the arrangement may be varied so that the spaces are of essential equal width while the printed lines may be of varied widths. The associated means would then be adjusted in accordance with the teaching of the invention to effect decoding of the document. It is therefore understood that the foregoing description and drawing is to be interpreted as illustrative and not as limiting except for such limitations as may be set forth in the claims.

We claim:

1. An optically scannable coded document comprising a printed assemblage of lines of predetermined thicknesses on a background of contrasting color and in which the transverse dimensions of the spaces between the lines is also predetermined, said assemblage of lines and spaces being selected from one of two combinations consisting essentially of:

A. an arrangement wherein the thickness of all of said lines of the code as a first indicia are maintained substantially constant while the spaces between the lines, as a second indicia, have a transverse dimension either relatively narrower or relatively wider than the first indicia, and B. an arrangement wherein the transverse dimension of all of said spaces between said lines as a first indicia are maintained constant while the lines as the second indicia have a thickness which is narrower or wider than said first indicia, said assemblage of indicia comprising lines and spaces being representative of bits of a binary notation and wherein the variations in the thickness of said lines and the transverse dimensions of said spaces are adapted to be translated into binary notation, the coded representation of each digit of said binary notation being modified by the incorporation of an additional bit indicia so that the printed indicia for each digit occupies substantially the same transverse area and being decodable electro-optically into binary intelligible symbols.

2. The code of claim 1 in which black lines are applied on a contrasting substrate.

3. The code of claim 1 comprising a row of black lines of substantially uniform thickness on a white substrate.

4. A data processing system comprising: coded indicia consisting of a binary notation in which the bit elements of the coded indicia are represented by a row of printed lines of predetermined widths, as a first bit indicia, in combination with spaces between said lines, as the second bit indicia, said combination providing means for storing optically decodable data by proportionately varying the relative width of the second of said indicia to have a transverse dimension which is wider or narrower than the transverse dimension of said first indicia while maintaining the width of the other indicia relatively constant; electro-optical means for scanning said lines and spaces to produce an identifiable output pulse in response to said proportionate variation, a first up-down counter to register pulses proportionate to said variation and a second up-down counter operable when the next successive indicia of said code is optically scanned and the down count of said first counter has not been completed, and means for processing said pulses registered from the data encoded in said printed line and space combination.

5. A data processing system comprising a coded document having a format consisting essentially of a row of printed lines of equal thickness in combination with spaces between said lines which have a transverse dimension either greater or smaller than said line thickness, said combination by virtue of the variation in space and line width dimensions providing means for storing optically decodable data and being representative of a predetermined binary code; said binary code utilizing an equal number of zero and one bits for each digit; electro-optical means for scanning said lines and spaces to produce an identifiable output pulse in response thereto, a first up-down counter to register pulses proportionate to the width of said lines and a second up-down counter operable when the next successive space following a scanned line is relatively narrow, and means for processing said pulses to register the data encoded in said printed line and space combination.

6. Means for storing data in the form of optically recognizable marks which are representative of a binary code and are adapted to be read by an optical scanner comprising: a plurality of printed lines of substantially uniform thickness imprinted on a substrate of contrasting color and arranged so that said lines are provided with spaces having one of two different widths between each line and consist of spaces which are narrow relative to said line thickness or spaces which are wide relative to said line thickness, to form a combination according to a predetermined code, the combination of lines and spaces for each digit of said code occupying substantially equal space, said lines each establishing a reference for an associated photo-optical scanning device which senses the next adjacent space in scanning sequence in order to identify the character of the information related to the thickness of said adjacent space, a first up-down counter to register pulses proportionate to the width of said lines and a second up-down counter operable only when the next successive space following a scanned line is relatively narrow.

7. Means for storing data adapted to produce responses in an optical reading device comprising an array of printed lines and spaces wherein said lines as a first indicia are of relatively uniform width having an initial portion for initiating, through a first up-down counter, a response in the reading device and an end portion for producing an opposite response in the reading device, said responses being registered through a first up-down counter, second indicia consisting of spaces characterized by relative variation in width alternately interposed between said first indicia for producing in said reading device different responses said second indicia consisting of widths relatively narrower than said first indicia and widths relatively wider than said first indicia, said variation in said second indicia characterizing the stored data, and a second up-down counter operable to register responses only when said second indicia compared to said first indicia is relatively narrow.

8. Means in accordance with claim 7 characterized additionally by a self-learning capability which functions so that each increment of line and space provides a self-clocking unit.

9. Data storing means according to claim 7 wherein said first indicia and said other indicia further comprise individual data storage capacity therein exclusive of the data stored in said spacing between said indicia.

10. Data storing means according to claim 7 wherein said first indicia and said other indicia further comprise printed lines, said line widths being greater than the spacing between said indicia to store one data bit and said line widths being less than the spacing between said indicia to store a different data bit.

11. Data storing means according to claim 7 wherein said first indicia and said other indicia comprise printed lines of predetermined width separated by spaces, said space widths being greater than the spacing between said indicia to store one data bit and said space widths being less than the spacing between said indicia to store a different data bit.

12. A merchandise ticket having data encoded thereon comprising a tag suitable for receiving printed ink impressions thereon, said ink impressions including a row of lines representative of bits of binary encoded digits, said lines being of a uniform width and having spaces therebetween, said spaces being a first width to represent one type of data bit and being a second width to represent another type of data bit, said ink impressions which form said lines and spaces being representative of a modified binary code in which each digit contains the same number of one bits and zero bits and one additional bit so that each digit combination occupies the same spacing irrespective of the type of data bits which comprise the digit.

13. The ticket of claim 12 wherein the ink impressions are black print on a contrasting ticket substrate.

14. A merchandise ticket according to claim 12 wherein said tag is approximately 1 inch wide and on the order of 3 inches long, said uniform line widths being about 0.015 inch wide and at least some of said spaces between said lines being about 0.01 inch and 0.02 inch in width.

15. A merchandise ticket according to claim 12 wherein at least one of said spaces is about 0.03 inches in width to indicate that the immediately preceding stored data is a particular type of data bit.

16. A data storage method comprising the steps of imprinting a ticket with an array of spaced lines of predetermined uniform width representative of encoded digits, spacing said individual lines each from the next adjacent of said lines in which some of said spacings are less than the width of at least one of said adjacent lines to indicate a first type of data bit and in which some of the other said spacings are greater than the width of at least one of said adjacent lines to indicate another type of data bit, each segment of said inscribed array which represents a digit having the same number of one bits and zero bits thereby occupying substantially the same space as any other segment in accordance with a modified binary code irrespective of the type of data bits which comprise the digit.

17. A data retrieval method comprising the steps of encoding a member by imprinting thereon an array of lines of predetermined uniform width, each of said lines being spaced from the next adjacent line by a distance that is greater or less than the width of said adjacent lines in accordance with a preestablished code, moving an optical reading device across said array of lines, counting forward with a first counter at a substantially fixed rate starting as the reading device intersects the beginning of, and during the time required to cross one of said lines and counting backward at said rate starting when the reading device intersects the end of said line and during the time required to cross at least a portion of the space adjacent to said line, registering the presence of a line or a space when said backward count is substantially equal to said forward count, and registering responses with a second counter which is operable only when the time required to cross the space adjacent to said line is less than the duration of the forward count.

18. The method of claim 17 characterized by an adaptability to respond to the speed of movement of said reading device across said array of lines so that the said forward count increases or decreases respectively as the speed of movement of the reader decreases or increases.

19. The method of claim 17 characterized by a self-learning capability in which a change in each line and space unit will provide a corresponding change in the clock count.

* * * * *